(12) United States Patent
Maemine (10) Patent No.: US 6,542,322 B2
(45) Date of Patent: *Apr. 1, 2003

(54) ROTARY HEAD APPARATUS WITH HIGH RATE OF DATA TRANSFER

(75) Inventor: Kenji Maemine, Miyagi-ken (JP)

(73) Assignee: Alps Electric Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,194

(22) Filed: May 10, 1999

(65) Prior Publication Data

US 2001/0043442 A1 Nov. 22, 2001

(30) Foreign Application Priority Data

May 25, 1998 (JP) .......................... 10-142851

(51) Int. Cl.[7] .............................................. G11B 15/14
(52) U.S. Cl. ...................... 360/64; 360/53; 360/271.1
(58) Field of Search ....................... 360/271.5, 271.1, 360/272, 281, 281.1, 281.7, 18, 64, 61, 62, 53; 386/63, 124, 69, 96, 68

(56) References Cited

U.S. PATENT DOCUMENTS

| | | | | |
|---|---|---|---|---|
| 4,985,785 A | * | 1/1991 | Matsuoka et al. | 360/62 |
| 5,276,566 A | * | 1/1994 | Clifford, Jr. | 360/64 |
| 5,339,205 A | * | 8/1994 | Sudoh et al. | 360/53 |
| 5,459,617 A | * | 10/1995 | Yanagihara | 360/21 |
| 5,521,779 A | | 5/1996 | Arakawa et al. | 360/108 |
| 5,684,649 A | * | 11/1997 | Ozue | 360/64 |
| 5,796,537 A | * | 8/1998 | Goker et al. | 360/84 |
| 5,844,737 A | * | 12/1998 | Fukuoka et al. | 360/18 |
| 5,881,204 A | * | 3/1999 | Nishiumi et al. | 386/96 |
| 5,903,406 A | * | 5/1999 | Jeon | 360/64 |
| 5,933,567 A | * | 8/1999 | Lane et al. | 386/68 |
| 5,953,482 A | * | 9/1999 | Suzuki et al. | 386/63 |
| 6,064,538 A | * | 5/2000 | Higuchii | 360/66 |
| 6,081,398 A | * | 6/2000 | Ozue | 360/64 |

FOREIGN PATENT DOCUMENTS

| | | |
|---|---|---|
| DE | 36 03 239 C2 | 10/1986 |
| JP | 59-87604 * | 5/1984 |
| JP | 62 180 501 AA | 8/1987 |

* cited by examiner

Primary Examiner—Brian E. Miller
Assistant Examiner—Tianjie Chen
(74) Attorney, Agent, or Firm—Brinks Hofer Gilson & Lione (57) ABSTRACT

In a rotary head apparatus a first reproducing magnetic head and a second reproducing magnetic head are oppositely arranged between a rotating shaft; and a first recording magnetic head and a second recording magnetic head are also oppositely arranged between the rotating shaft. One of the magnetic head elements of the first recording magnetic head and one of the magnetic head elements of the second recording magnetic head are connected to a first channel of a rotary transformer; and the other magnetic head element of the first recording magnetic head and the other magnetic head element of the second recording magnetic head are connected to a second channel of the rotary transformer, to thereby enable simultaneous recording and reproducing.

2 Claims, 6 Drawing Sheets

ROTARY HEAD APPARATUS WITH HIGH RATE OF DATA TRANSFER

BACKGROUND OF THE INVENTION

1. Field of the Invention

The present invention relates to a rotary head apparatus and, more particularly, to a rotary head apparatus having a function to verify recorded data.

2. Description of Related Art

Figure 5:
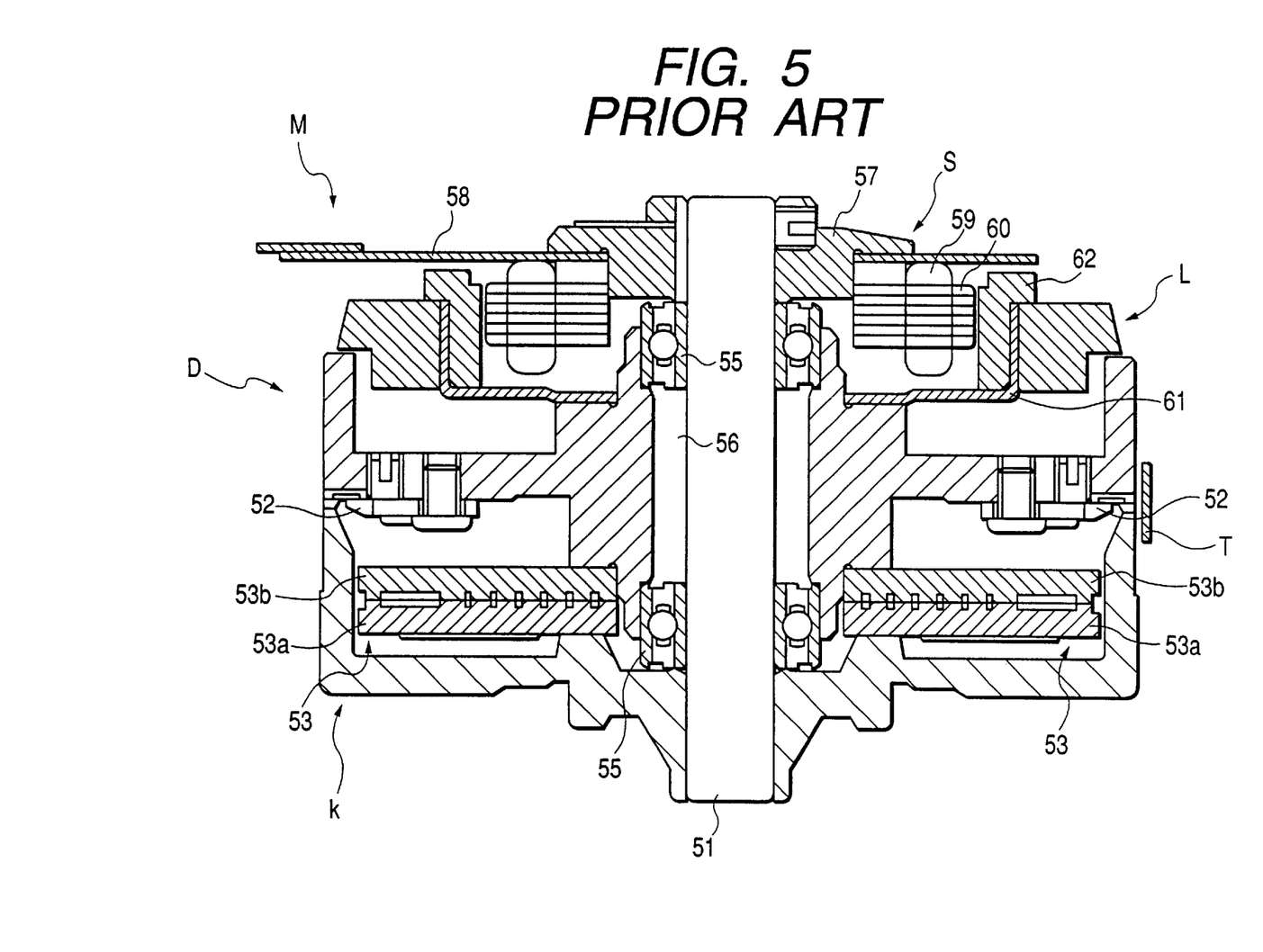
FIG. 5 is a sectional view of a prior art rotary head apparatus.
Figure 6:
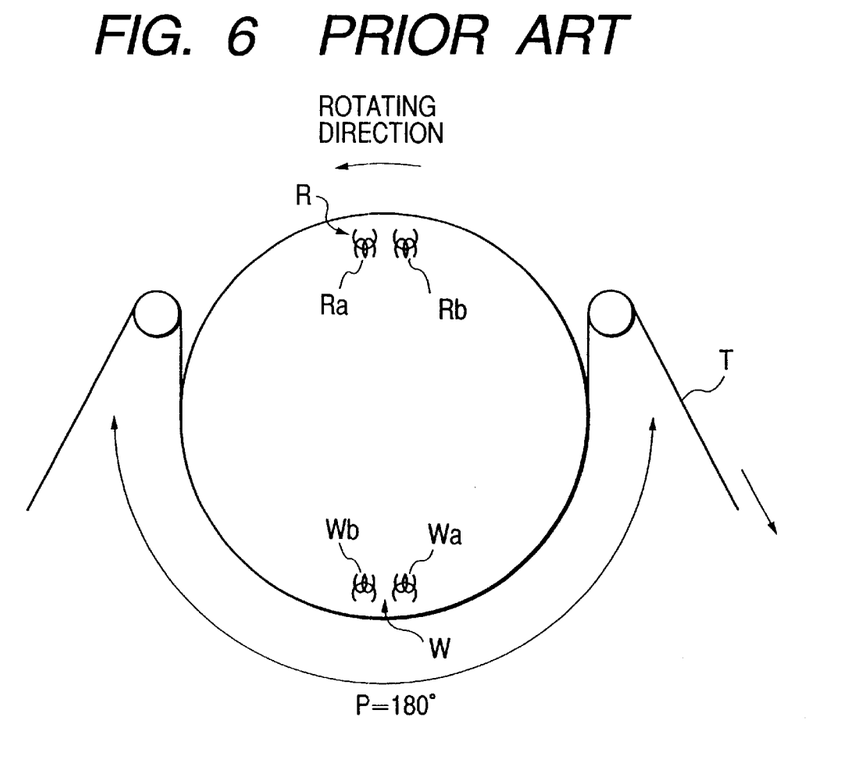
FIG. 6 is an explanatory view of the prior art rotary head apparatus.
Figure 7:
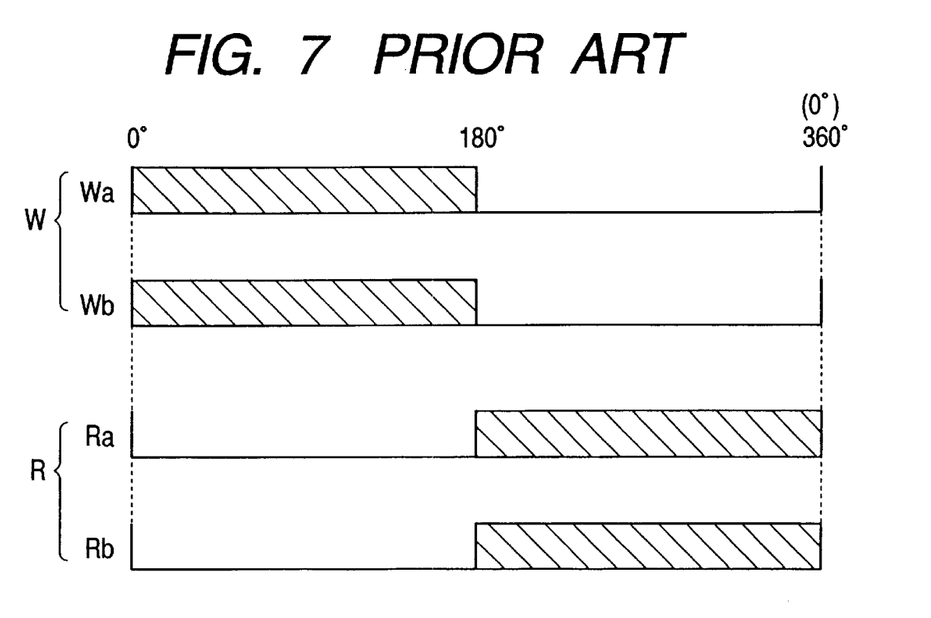
FIG. 7 is a timing chart showing on the angle axes the recording signal and the reproducing signal of the prior art rotary head apparatus.

FIG. 5 is a sectional view of a prior art rotary head apparatus. FIG. 6 is an explanatory view of the prior art rotary head apparatus. And FIG. 7 is a timing chart showing a recording signal and a reproducing signal of the prior art rotary head apparatus which are plotted on angle axes.

The magnetic recording-reproducing device mounted with this type of rotary head apparatus is used in backing up data in a computer, and has a verifying function to perform a read-after-write operation. The prior art rotary head apparatus, as shown in FIG. 5, has a stationary drum K mounted in a lower position, a rotary drum D mounted above the stationary drum K, and a motor M mounted above the rotary drum D. The stationary drum K has a cylindrical stationary shaft 51 fixed at center thereof. The rotary drum D is rotatable on the center of the stationary shaft 51 and fitted with four magnetic heads 52.

These four magnetic heads 52 are each comprised of a recording magnetic head W including a couple of magnetic head elements and a reproducing magnetic head R including a couple of magnetic head elements. For the recording magnetic head W a magnetic head called a combination head disposed adjacently to the couple of magnetic head elements Wa and Wb is used. Similarly, for the reproducing magnetic head R there is used a combination head comprising a couple of magnetic head elements Ra and Rb. The two magnetic heads W and R are symmetrically arranged on both sides of the stationary shaft 51 at center.

A rotary transformer 53 supplies a recording signal at the time of recording to the four magnetic heads 52 and takes out a reproducing signal at the time of reproduction. The rotary transformer 53 is comprised of a transformer 53a on the stationary side and a transformer 53b on the rotary side. These rotary transformers 53 are disposed between the stationary drum K and the rotary drum D. The transformer on the stationary side 53a is mounted on the stationary drum K. The transformer on the rotary side 53b is mounted on the rotary drum D and turns together with the rotating drum D.

Two ball bearings 55, 55 are mounted on both sides of a center hole 56 of the rotary drum D, so that the rotary drum D will be rotatable.

The motor M is comprised of a stator section S supported on the stationary shaft 51 and a rotor section L mounted on the rotary drum D. The rotor section L is mounted on the top of the rotary drum D and the stator section S is secured on the stationary shaft 51 so as to be above the rotary section L.

The stator section S is comprised of a cylindrical stationary member 57 inserted on the stationary shaft 51, a motor control circuit board 58 mounted with a motor control circuit, and a core 60 of a magnetic metal fitted with a coil 59.

The rotor section L is formed in a shape of cup and has a rotor motor yoke 61 attached on the rotary drum D and a cylindrical magnet 62 fixedly bonded to the inside of the side wall of the rotor motor yoke 61. The core 60 is disposed inside the cylindrical magnet 62; the core 60 and the magnet 62 are oppositely arranged with the same amount of clearance provided all around.

The above-described prior art rotary head apparatus is of such a design that the rotary drum D is turned by power from the motor M; with the rotation of the rotary drum D the four magnetic heads 52 also are turned to move a magnetic tape T pressed with a predetermined pressure in contact with these magnetic heads 52, thereby performing recording or reproduction.

As shown in FIG. 6, the prior art rotary head apparatus is driven to perform read-after-write operation. At this time the rotary drum apparatus turns through an effective wrap angle P of about 180 degrees, that is, through the angle for signal recording into, or reproducing from, the magnetic tape T. Furthermore, information, when recorded on the magnetic tape T by the recording magnetic head W, is recorded by the magnetic head W during a turn from 0° (the reference position in which the recording magnetic head W of the rotary drum D faces the magnetic tape T as shown in the timing chart in FIG. 7) to 180° of the rotary drum D; that is, magnetic head elements Wa and Wb operate to record nearly simultaneously the recording magnetic head W of the rotary drum D. The magnetic head elements Wa and Wb are arranged a little apart from each other, and therefore there is an about 1° to 2° delay on the angle axis. Consequently the magnetic head element Wb follows the magnetic head element Wa in the direction of rotation (i.e., direction of recording).

Reproduction using the reproducing magnetic head R is a read-after-write operation to check to see whether or not signal recording on the magnetic tape T is done properly in accordance with a reproducing signal. The reproducing magnetic head R and the recording magnetic head W are arranged at a spacing of 180° on the outer peripheral surface of the rotary drum D; the reproducing angle, therefore, will not overlap the recording angle at which the recording signal is recorded. That is, while the rotary drum D is turning from 180° to 360° (i.e., 0°) within which angle no recording is done by the recording magnetic head W, the reproducing magnetic head R reproduces the signal recorded by the recording magnetic head W. The recording signal to be reproduced by the magnetic head element Ra at this time is a signal recorded by the magnetic head element Wa, and the signal to be reproduced by the magnetic head element Rb is a signal recorded by the magnetic head element Wb. In this manner the read-after-write operation is repeated.

In this type of rotary head apparatus, however, recording is done by the recording magnetic head W only within the range of 180° during a 360° turn (one turn) of the rotary drum D as shown in FIG. 7. Furthermore, reproduction for the read-after-write operation that can be done by the reproducing magnetic head R is similarly 180°. In a rotary head apparatus having the magnetic head 52 including a couple of combination heads, the effective wrap angle P is about 180°, and therefore the speed of rotation, that is, the time for data recording and reproducing for read-after-write operation can not be decreased as far as the same constitution as mentioned above is employed. Consequently the rate of data transfer also can not be improved.

Various kinds of means have been proposed in an attempt to improve the rate of data transfer; of these means there has been known a means for improving the rate of data transfer by a rotary head apparatus using eight magnetic head elements including two combination heads of the first and second recording magnetic heads W1 and W2 and two combination heads of the first and second reproducing magnetic heads R1 and R2. The recording magnetic head W1 is comprised of a combination head with a couple of magnetic head elements W1a and W1b adjacently arranged. Similarly the recording magnetic head W2 is comprised of a couple of magnetic head elements W2a and W2b; the reproducing magnetic head R1 is comprised of a couple of magnetic head elements R1a and R1b; and the reproducing magnetic head R2 is comprised of a couple of magnetic head elements R2a and R2b.

The couple of recording magnetic heads W1 and W2 are arranged symmetrically with the stationary shaft 51 placed at center. In a similar manner the couple of reproducing magnetic heads R1 and R2 are also symmetrically positioned with the stationary shaft 51 at center. The four magnetic heads 52 are arranged at an equal spacing of 90° on the outer peripheral surface of the cylindrical rotary drum D in the order of W1, R1, W2 and R2 when viewed clockwise.

According to the rotary head apparatus thus constituted, the recording magnetic head and the reproducing magnetic head come into contact with, and slide on, the magnetic tape T at the same timing, so that recording and reproducing, i.e., the read-after-write operation, can be performed simultaneously, thereby enabling to improve the data transfer rate. For instance, when the effective wrap angle P of the magnetic tape T is around 180°, the magnetic tape T thus wrapped runs in contact with the recording head including one combination head and also with the reproducing head including one combination head at any timing. That is, recording a recording signal is done by means of the recording magnetic head and at the same time reproducing operation is performed by means of the reproducing magnetic head. At any angle of rotation, therefore, recording and reproducing the read-after-write operation are continuously carried out, thereby increasing the rate of data transfer twice higher as compared with the prior art rotary head apparatus.

One combination head is provided with two magnetic head elements. Therefore, when four combination heads are used, the rotary transformer needs eight signal channels so that the magnetic head element s can send and receive different signals. Also provided is a preamplifier circuit which amplifies a reproducing signal output to reduce a noise effect caused by interference from the recording magnetic head. Furthermore, one power supply channel for supplying the power to the preamplifier circuit is required. That is, nine channels in all are required. In the magnetic recording-reproducing device including a downsized rotary head apparatus, the rotary transformer has also been downsized. In such a rotary head apparatus, therefore, it is difficult to provide nine channels. If it is possible to provide nine channels, adjacent channels are arranged very close to each other; therefore because the recording signal and the reproducing signal are high-frequency signals, the signals in the adjacent channels will not be affected, resulting in an increased signal noise. Furthermore, the rotary transformer, if provided with nine channels, will become larger in size and accordingly high in cost, thus upsizing the rotary head apparatus. That is, it will become hard to downsize the rotary head apparatus. Consequently it is hard to improve the rate of data transfer while increasing the number of the combination heads.

SUMMARY OF THE INVENTION

It is an object of the present invention to provide a rotary head apparatus which has a verifying function and a high data transfer rate. It is another object of the present invention to provide a rotary head apparatus which can be downsized. It is further another object of the present invention to provide a rotary head apparatus capable of reducing a noise effect.

As the first means for solving the above-described problem, the rotary head apparatus of the present invention is provided with a first set of recording magnetic head including two magnetic head elements, a second set of recording magnetic head including two magnetic head elements, a first set of reproducing magnetic head including two magnetic head elements, a second set of reproducing magnetic head including two magnetic head elements, and a rotary transformer mounted on the drum for transmitting a signal to the magnetic heads. The first set of reproducing magnetic head and the second set of reproducing magnetic head are oppositely arranged on both sides of the rotating shaft. Also the first set of recording magnetic head and the second set of recording magnetic head are oppositely arranged on both sides of the rotating shaft. One of the couple of magnetic head elements of the first set or recording magnetic head and one of the couple of magnetic head elements of the second set of recording magnetic head are connected to the first channel of the rotary transformer; and the other one of the couple of magnetic head elements of the first set of recording magnetic head and the other one of the couple of magnetic head elements of the second set of recording magnet head are connected to the second channel of the rotary transformer, so that recording and reproducing can be done at the same time.

Furthermore, in the rotary head apparatus of the present invention, as the second means of solution, one of the couple of magnetic head elements of the first set of reproducing magnetic head and one of the couple of magnetic head elements of the second set of reproducing magnetic head are connected to the third channel of the rotary transformer. Also the other couple of magnetic head elements of the first set of reproducing magnetic head and the other couple of magnetic head elements of the second set of reproducing magnetic head are connected to the fourth channel of the rotary.

Furthermore, the rotary head apparatus of the present invention, as the third means of solution, is provided with a preamplifier circuit connected to the magnetic head element of the reproducing magnetic head and an output changeover circuit; and the fifth channel of the rotary transformer is provided with a channel for selectively supplying the power to the preamplifier circuit.

DESCRIPTION OF THE PREFERRED EMBODIMENTS

Figure 1:
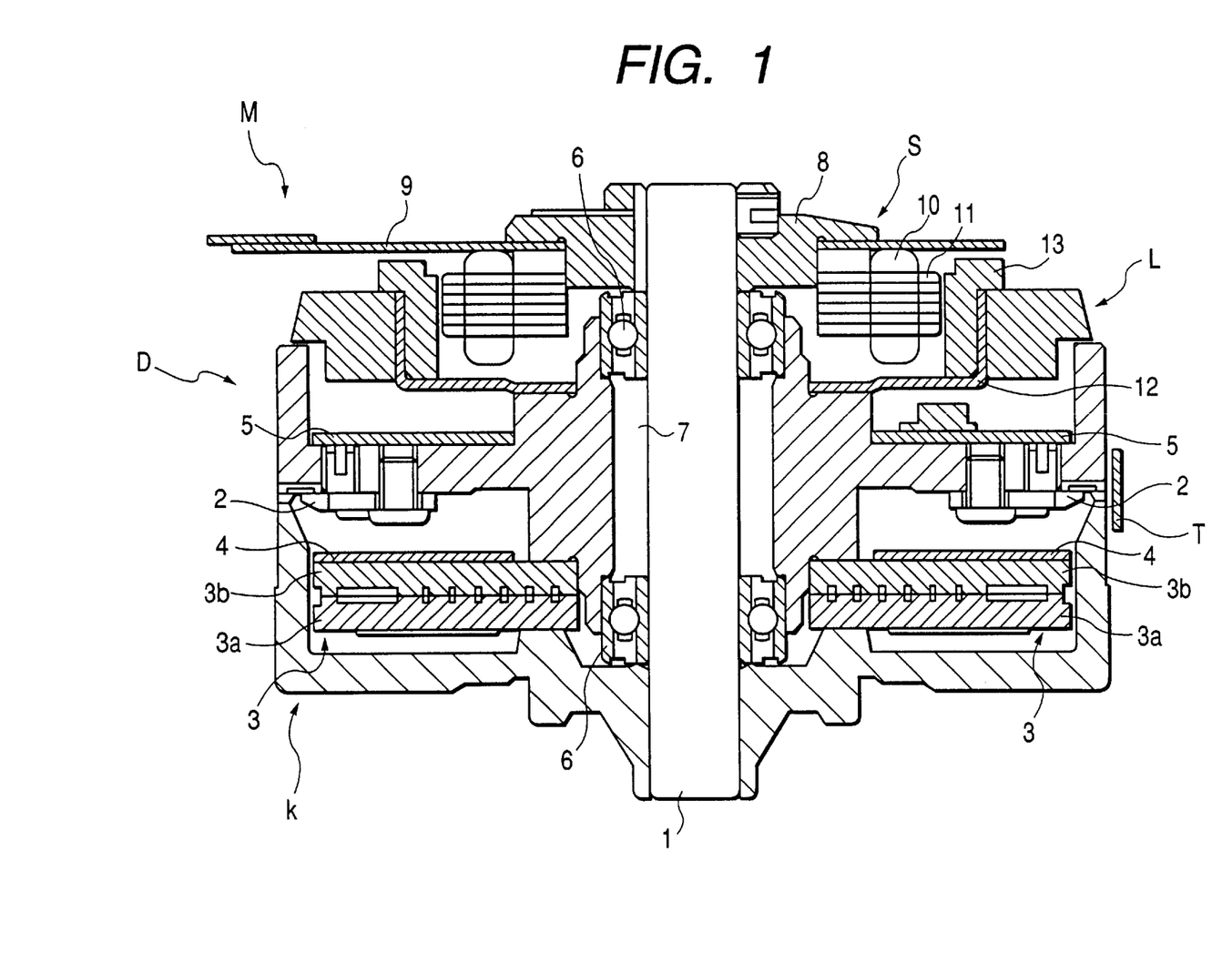
FIG. 1 is a sectional view of a rotary head apparatus according to the present invention.
Figure 2:
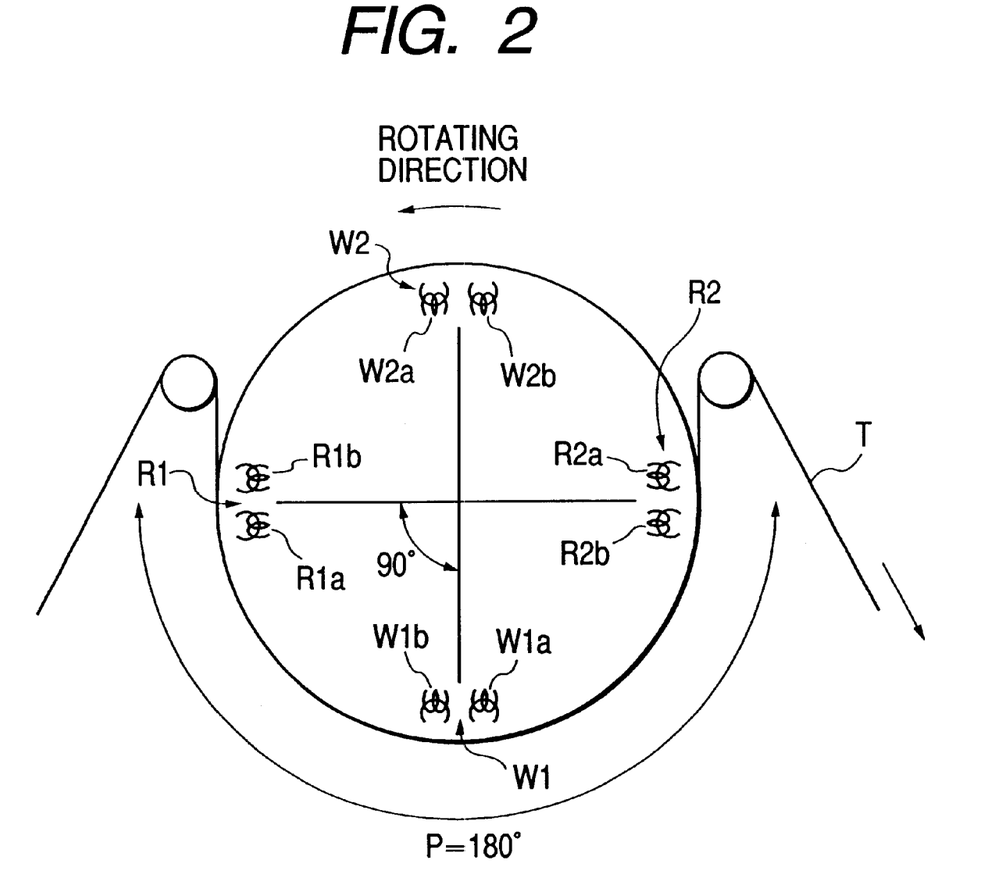
FIG. 2 is an explanatory view of the a rotary head apparatus according to the present invention.
Figure 3:
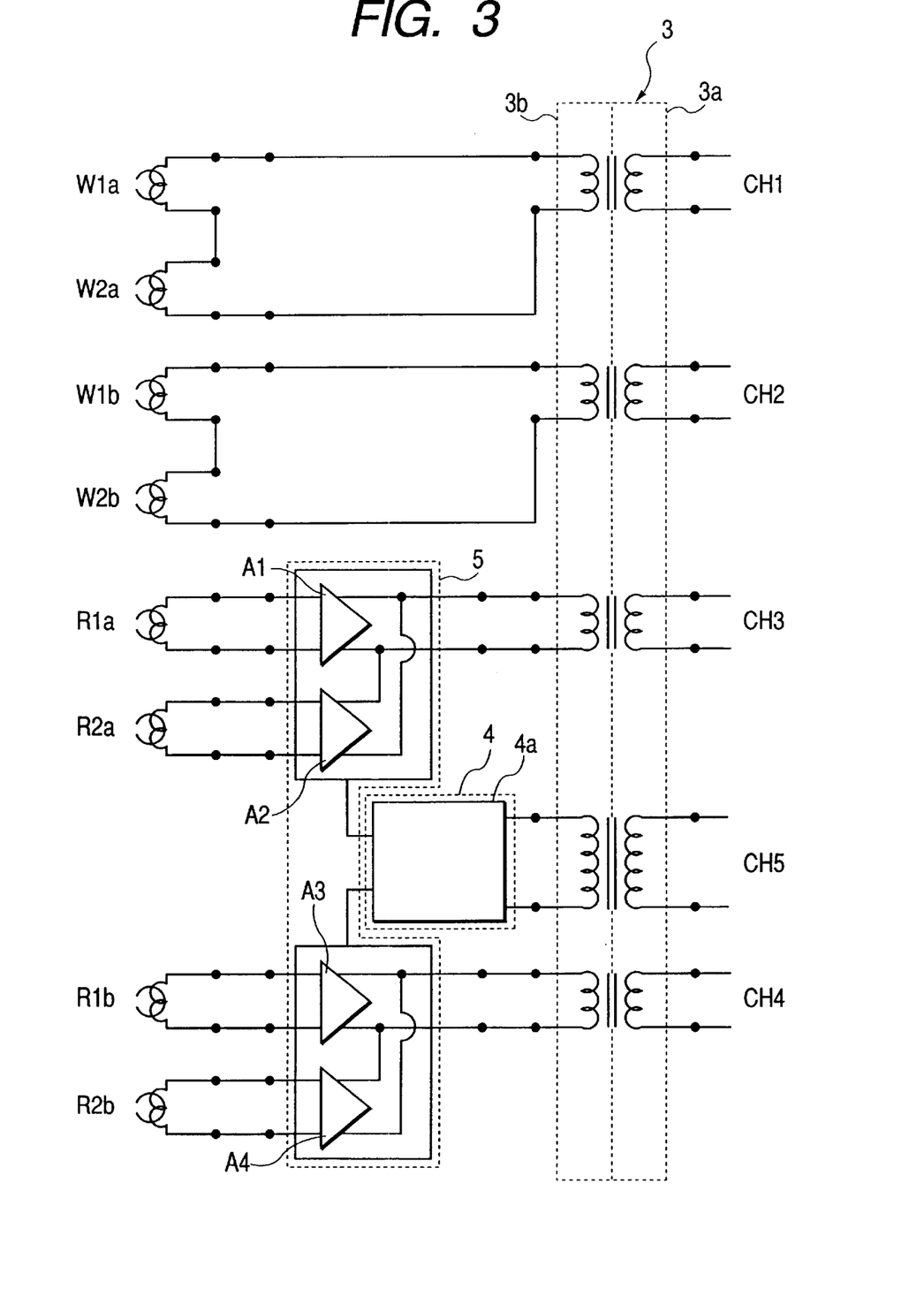
FIG. 3 is a circuit diagram of the a rotary head apparatus according to the present invention.
Figure 4:
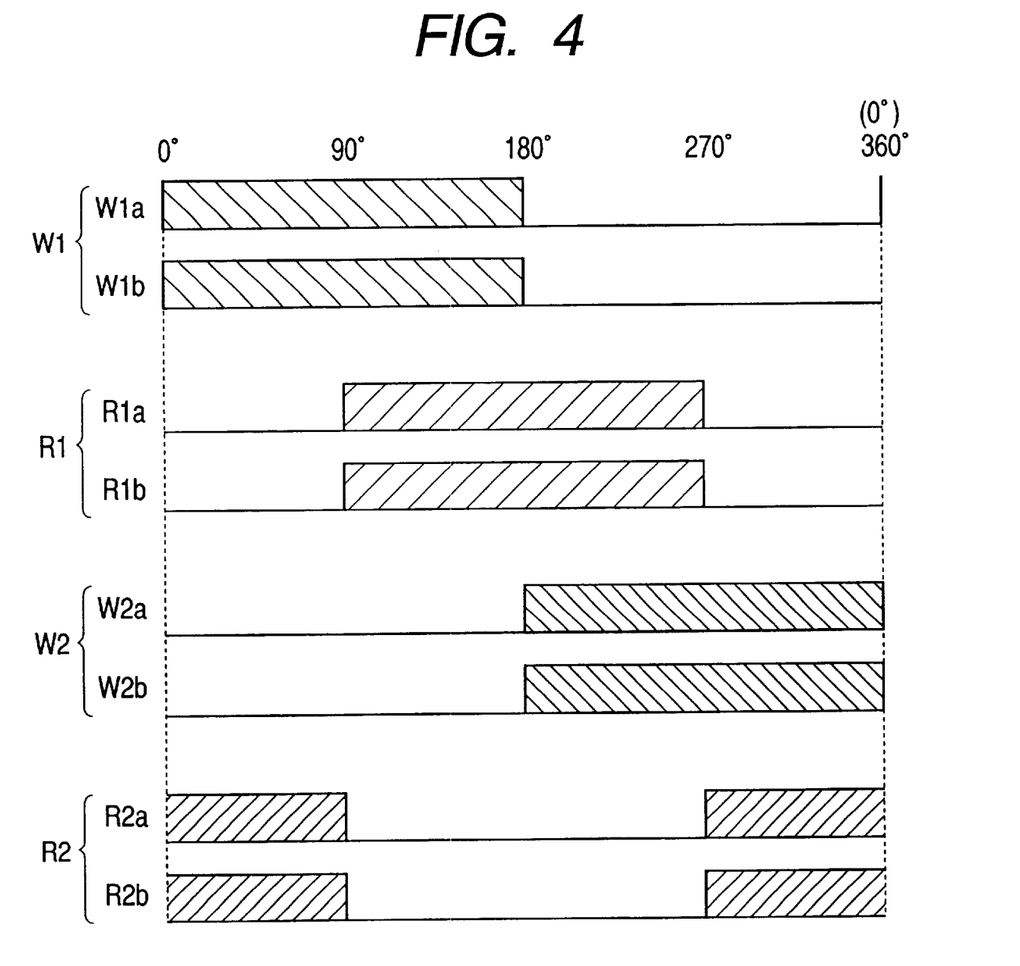
FIG. 4 is a timing chart showing, on angle axes, a recording signal and a reproducing signal of the rotary head apparatus shown in FIG. 2.

Preferred embodiments of a rotary head apparatus according to the present invention will be described with reference to the accompanying drawings. FIG. 1 is a sectional view of the rotary head apparatus according to the present invention. FIG. 2 is an explanatory view showing the rotary head apparatus of the present invention. FIG. 3 is a circuit diagram of the rotary head apparatus of the present invention. And FIG. 4 is a timing chart showing a recording signal and a reproducing signal of the rotary head apparatus plotted on angle axes.

The rotary head apparatus of the present invention, as shown in FIG. 1, has a stationary drum K located in the lower position, a rotary drum D disposed above the stationary drum K, and a motor M mounted above the rotary drum D. The stationary drum K and the rotary drum D are made of aluminum. At the center of the stationary drum K there is secured a cylindrical stationary shaft 1. Furthermore, mounted on the rotary drum D which is rotatable on the center of the stationary shaft 1 are four magnetic heads 2 including a combination head. These four magnetic heads 2 is comprised of a first recording magnetic head W1, a second recording magnetic head W2, a first reproducing magnetic head R1, and a second reproducing magnetic head R2. The first recording magnetic head W1 is comprised of magnetic head elements W1a and W1b. The second recording magnetic head W2 is comprised of magnetic head elements W2a and W2b. Similarly, the first reproducing magnetic head R1 is comprised of magnetic head elements R1a and R1b, and the second reproducing magnetic head R2 includes magnetic head elements R2a and R2b. The two recording magnetic heads W1 and W2 are symmetrically positioned with the stationary shaft 1 disposed at center as shown in FIG. 2. Similarly, the two reproducing magnetic heads R1 and R2 are symmetrically positioned with the stationary shaft 1 disposed also at center. The four magnetic heads 2 are arranged at an equal spacing of 90° on the outer peripheral surface of the cylindrical rotary drum D counterclockwise in the order of W1, R1, W2 and R2.

A rotary transformer 3 which supplies a recording signal at the time of recording and takes out a reproducing signal at the time of reproduction includes a transformer 3a on the stationary side and a transformer 3b on the rotary side with respect to the four magnetic heads 2. The rotary transformers 3 are disposed between the stationary drum K and the rotary drum D; the transformer 3a on the stationary side is mounted on the stationary drum K, while the transformer 3b on the rotary side is mounted on the rotary drum D so as to turn together with the rotary drum D.

The transformer circuit board 4 is mounted on the transformer 3b on the rotary side as shown in FIGS. 1 and 3, and a rectifier circuit 4a is mounted on the circuit board. The rectifier circuit 4a functions to rectify the power signal supplied from the rotary transformer 3.

The preamplifier circuit board 5 is mounted with a preamplifier for signal amplification and a changeover circuit and amplifies the output of the reproducing magnetic heads R1 and R2. The recording signal outputted from the recording magnetic heads W1 and W2 is much larger than the reproducing signal outputted from the reproducing magnetic heads R1 and R2. When two signals are inputted into the rotary transformer 3, the recording signal interferes with the reproducing signal which is feebler than the recording signal, thereby giving a noise. To prevent giving such a noise caused by the interference to the reproducing signal, the preamplifier circuit is provided to thereby amplify the output from the reproducing magnetic heads R1 and R2 to thereby increase the reproducing signal to be outputted, to the extent that no interference will be given to the reproducing signal from the recording signal and accordingly the noise effect will be prevented. The preamplifier circuit board 5, as shown in FIG. 1, is mounted on the upper surface of the rotary drum D. The preamplifier circuit is provided one for each head element. To the first preamplifier circuit A1, the magnetic head element R1a mounted on the first reproducing magnetic head R1 is connected. Also to the second preamplifier circuit A2, the magnetic head element R2a arranged on the second reproducing magnetic head R2 is connected. Furthermore, to the third preamplifier circuit A3 the magnetic head element R1b mounted on the first reproducing magnetic head R1 is connected, and to the fourth preamplifier circuit A4 the magnetic head element R2b mounted on the fourth reproducing magnetic head R2 is connected.

The rotary transformer 3 is comprised of the transformer 3a on the stationary side and the transformer 3b on the rotary side, either of which has five channels. The first channel CH1 which is one of the five channels of the rotary transformer 3 is commonly connected with the magnetic head element W1a mounted on the first recording magnetic head W1 and the magnetic head element W2a mounted on the second recording magnetic head W2. Similarly, the second channel CH2 is commonly connected with the magnetic head element W1b mounted on the first recording magnetic head W1 and the magnetic head element W2b mounted on the second recording magnetic head W2.

Commonly connected to the third channel CH3 through an unillustrated changeover circuit which changes over the output between the preamplifier circuit A1 and the preamplifier circuit A2 are the magnetic head element R1a mounted on the first reproducing magnetic head R1 through the first preamplifier circuit A1 and the magnetic head element R2a mounted on the second reproducing magnetic head R2 through the second preamplifier circuit A2. Similarly, commonly connected to the fourth channel CH4 through an unillustrated changeover circuit which changes over the output between the preamplifier circuit A3 and the preamplifier circuit A4 are the magnetic head element R1b mounted on the first reproducing magnetic head R1 through the third preamplifier circuit A3 and the magnetic head element R2b mounted on the second reproducing magnetic head R2 through the fourth preamplifier circuit A4. Also to each of the preamplifier circuits A1, A2, A3 and A4, the rectifier circuit 4a is connected and also the fifth channel CH5 for supplying the ac power is commonly connected. That is, the rotary transformer 3 is provided with five channels in all as described above. The above-described channel arrangement in relation to the rotary transformer 3 is made from the outermost periphery towards the innermost periphery in the following order: CH5 (POWER)→CH2 (RECORD)→CH1 (RECORD)→CH4 (REPRODUCE)→CH3 (REPRODUCE), reducing a noise entering from the ac power source into the reproducing signal.

The rotary drum D is rotatably supported on two ball bearings 6, 6 which are mounted on the stationary shaft 1 and arranged on both sides of a center hole 7 of the rotary drum D.

The motor M is comprised of a stator section S supported on the stationary shaft 1 and a rotor section L mounted on the rotary drum D. The rotor section L is attached on the top of the rotary drum D, while the stator section S is fixedly mounted on the stationary shaft 1 above the rotor section L.

The stator section S is comprised of a cylindrical stationary member 8 inserted and mounted on the stationary shaft 1, a motor control circuit board 9 having a motor control circuit, and a magnetic metal core 11 mounted on the motor control circuit board 9 and provided with a coil 10.

The rotor section L is shaped like a cup, and has a rotor motor yoke 12 made of iron and mounted on the rotary drum D, and a cylindrical magnet 13 securely bonded on the inside of the side wall of the rotor motor yoke 12. The core 11 is arranged in the cylindrical magnet 13. There is provided the same amount of clearance all around between the core 11 and the magnet 13.

In the rotary head apparatus described above, the rotary drum D is driven with the power from the motor M. With the rotation of the rotary drum D, the four magnetic heads 2 also turn. The magnetic tape T is pressed with a specific pressure into contact with these magnetic heads 2, to thereby perform recording or reproduction.

As shown in FIG. 2, when the rotary head apparatus of the present invention is driven to perform read-after-write operation, the effective wrap angle P of the magnetic tape T on the rotary drum D is about 180°. The recording magnetic heads W1 and W2 are arranged at a spacing of 180°; therefore supposing that the reference point (0°) is in a position where the first recording magnetic head W1 is mounted on the rotary drum D which is turning as shown in the timing chart in FIG. 4, a recording signal is recorded by the first recording magnetic head W1 when the rotary drum D is turning from 0° to 180°, and is recorded by the second recording magnetic head W2 when the rotary drum D is turning from 180° to 360° (i.e., 0°). The magnetic head elements W1a and W1b, and W2a and W2b, are arranged slightly apart from each other, and accordingly there is about 1° to 2° delay on the angle axis; therefore the magnetic head element W1b follows the magnetic head element W1a, and the magnetic head element W2b follows the magnetic head element W2a.

As the first recording magnetic head W1 contacts the magnetic tape T to record the recording signal, the recording signal is sent from the first channel CH1 mounted on the rotary transformer 3, to the magnetic head element W1a. At this time, the same signal is sent simultaneously also to the magnetic head element W2a of the second recording magnetic head W2 which is commonly connected, together with the magnetic head element W1a of the first recording magnetic head W1, to the first channel CH1 and disposed on the opposite side. However, because the magnetic head element W2a is mounted opposite magnetic head element W1a, it is not in sliding contact with the magnetic tape T at the same time as magnetic head element W1a. Thus, although the recording signal sent to both the magnetic head element W1a and magnetic head element W2athe recording signal is only effective to record using the magnetic head element W1a.

When the magnetic head element W1a of the first recording magnetic head W1 comes into contact with the magnetic tape T to record a recording signal, the magnetic head element W1b adjacently disposed nearly simultaneously records on the magnetic tape T a recording signal that has been sent from the second channel CH2. Similar to the above, entirely the same recording signal (from the second channel CH2) is simultaneously sent to the magnetic head element W2b of the second recording magnetic head W2 which, together with the magnetic head element W1b, is commonly connected to, and disposed on the opposite side of, the second channel CH2. As above, only the magnetic head element W1b will record information from the recording signal sent from the second channel CH2 because only magnetic head element W1b is in contact with the magnetic tape T.

This situation is reversed when the second recording magnetic head W2 comes into contact with the magnetic tape T to record the recording signal. When the recording signal is stored on the magnetic tape T by the magnetic head element W2a, entirety the same recording signal is sent simultaneously to the magnetic head element W1a of the first recording magnetic head W1. However, since the magnetic head element W1a, located opposite to the magnetic head element W2a, does not slide in contact with the magnetic tape T, no recording operation is carried out by the magnetic head element W1a. Similarly, when the recording signal is recorded by the magnetic head element W2b on the magnetic tape T, entirely the same recording signal is sent simultaneously to the magnetic head element W1b of the second recording magnetic head W1. In this case, the magnetic head element W1b, located opposite to the magnetic head element W2b, will not slide in contact with the magnetic tape T, and no recording operation is performed by the magnetic head element W1b.

Reproduction by the reproducing magnetic heads R1 and R2 is a verifying operation by a reproducing signal to check to see whether signal recording on the magnetic tape T has been properly done. The reproduction by these two reproducing magnetic heads R1 and R2 are disposed 90° apart from the recording magnetic heads W1 and W2 as shown in FIG. 4; therefore while the rotary drum D is turning from 90° to 270°, the signal recorded by the first recording magnetic head W1 is reproduced by the first reproducing magnetic head R1. Also while the rotary drum D is turning from 270° to 450° (i.e., 90°), the second reproducing magnetic head R2 reproduces the signal recorded by the second recording magnetic head W2; and the signal thus reproduced is compared to see its matching with a signal to be recorded. When these signals differ, a read-after-write operation is done to perform re-recording. Recording and reproducing, as described above, are continuously performed at each predetermined angle of rotation.

When the reproducing magnetic heads R1 and R2 come into contact with the magnetic tape T to reproduce signals recorded on the magnetic tape T by the recording magnetic heads W1 and W2, the signals thus reproduced are amplified by each preamplifier circuit connected, subsequently being sent to an unillustrated magnetic recording-reproducing device via the third channel CH3 or the fourth channel CH4 in the rotary transformer 3.

The magnetic head element R1a of the first reproducing magnetic head R1 and the magnetic head element R2a of the second reproducing magnetic head R2 are connected to the third channel CH3.

Therefore, when the first reproducing magnetic head R1 comes into contact with the magnetic tape T to reproduce recording signals by the magnetic head element R1a, the output from the first preamplifier circuit A1 is selected to be supplied to the third channel CH3 by a changeover circuit (not depicted). Also when the rotary drum D turns and the magnetic head element R2a comes into contact with the magnetic tape T, the changeover circuit delivers the output from the second preamplifier circuit A2 to the third channel CH3. The magnetic head element operating in contact with the magnetic tape T to reproduce recorded information is selected, thus reliably sending an amplified reproducing signal to the rotary transformer 3. Furthermore, a changeover pulse signal is superimposed on the power supplied from the fifth channel CH5, so that the changeover circuit selects the output from the preamplifier circuit when the changeover circuit has detected the pulse signal.

Similarly, also between the magnetic head element R1b or the first reproducing magnetic head R1 which is connected to the same fourth channel CH4 via the third preamplifier circuit A3 and the magnetic head element R2b of the second reproducing magnetic head R2 disposed on the opposite side and connected via the fourth preamplifier circuit A4, the changeover circuit selects the output of the preamplifier circuit connected to the magnetic head element operating in contact with the magnetic tape T.

In all the recording and reproducing heads of the present embodiments, the two magnetic head elements oppositely disposed are connected to one channel of the rotary transformer 3. It is to be noticed, however, that the present invention may be applied only to the magnetic head element of the recording magnetic head or only to the magnetic head element of the reproducing magnetic head.

Furthermore in the present embodiment, the four magnetic heads are arranged in the clockwise order of W1, R1, W2 and R2 as shown in FIG. 2, but the head arrangement is not limited to the order mentioned above and may be arranged as W1, R2, W2 and R1. Furthermore, the effective wrap angle P is not limited to about 180° and may be over 90°; that is, the present invention is applicable to a rotary head apparatus having such a mechanism that a plurality of magnetic heads are simultaneously driven at an overlapped timing. Also, the present invention is applicable to a shaft-rotating type rotary head apparatus in which a rotating shaft is built integrally with a rotary drum rotatable in relation to a stationary drum.

According to the rotary head apparatus of the present invention, the first set of recording magnetic head and the second set of recording magnetic head are oppositely arranged between the rotating shaft, and the first set of reproducing magnetic head and the second set of reproducing magnetic head are also oppositely arranged between the rotating shaft; one of the magnetic head elements of the first set of recording magnetic head and one of the magnetic head elements of the second set of recording magnetic head are connected to the first channel of the rotary transformer; and the other magnetic head element of the first set of recording magnetic head and the other magnetic head element of the second set of recording magnetic head are connected to the second channel of the rotary transformer, to thereby simultaneously perform recording and reproducing. It is, therefore, possible to decrease the number of channels as compared with the number of channels in the rotary transformer which are proportioned one by one to each of the magnetic head elements of each recording magnetic head, thus downsizing the rotary transformer and accordingly the rotary head apparatus. Besides, because the number of the magnetic head elements has been increased by the use of the four combination heads, the rate of data transfer could be improved. Furthermore, the decrease in the number of channels in the rotary transformer enables such channel arrangement that adjacent channels will not contact, thus realizing signal input and output at the rotary transformer with little noise.

Furthermore, according to the rotary head apparatus of the present invention, one of the magnetic head elements of the first set of reproducing magnetic head and one of the magnetic head elements of the second set of reproducing magnetic head are connected to the third channel of the rotary transformer; and the other magnetic head element of the first set of reproducing magnetic head and the other magnetic head element of the second set of reproducing magnetic head are connected to the fourth channel of the rotary transformer, to thereby enable further decrease in the number of channels. Consequently it is possible to provide a rotary head which realizes a high data transfer rate with little noise, by downsizing the rotary head apparatus with the adoption of a downsized rotary transformer and by using the four combination heads.

Furthermore, according to the present invention the rotary head apparatus is provided with the preamplifier circuit connected to the magnetic head elements of the reproducing magnetic head and the output changeover circuit; and a channel for supplying the power to the preamplifier circuit is provided in the fifth channel of the rotary transformer, thereby enabling amplification of a reproducing signal from the magnetic head element of the reproducing magnetic head and accordingly preventing a recording signal interference. Furthermore, because the magnetic head element of the reproducing magnetic head from which no signal has been reproduced yet slides on the tape at the wrapping end of the magnetic tape, the effect of noise occurring at the time of tape sliding can be reduced.

What is claimed is:

1. A rotary head apparatus, comprising:

a rotary drum comprising a first recording magnetic head including a first pair of magnetic head elements, a second recording magnetic head including a second pair of magnetic head elements, a first reproducing magnetic head including a third pair of magnetic head elements, and a second reproducing magnetic head including a fourth pair of magnetic head elements, wherein the magnetic head elements of each pair of magnetic heads are arranged adjacent to each other, said first recording magnetic head, said first reproducing magnetic head, said second recording magnetic head, and said second reproducing magnetic head are arranged in this order and are equally spaced by 90° in a circumferential direction at a circumferential surface of the rotary drum, said first recording magnetic head and the second recording magnetic head are oppositely mounted at symmetrical positions with a rotating shaft of said rotary drum being held therebetween, and the first reproducing magnetic head and said second reproducing magnetic head are oppositely disposed at symmetrical positions with said rotating shaft being held therebetween, a rotary transformer comprising a rotary side transformer is disposed on a side of the rotary drum and a fixed side transformer is disposed at a predetermined fixed position to supply a signal to each of said magnetic heads, the rotary transformer includes a first channel that supplies a first recording signal to a first magnetic head element in each of said first and second recording magnetic heads, a second channel that supplies a second recording signal to a second magnetic head element in each of the first and second recording magnetic heads, a third channel to which a first reproduced signal is supplied from a first magnetic head element in each of the first and second reproducing magnetic heads and a fourth channel to which a second reproduced signal is supplied from a second magnetic head element in each of said first and second reproducing magnetic heads, the first magnetic head elements in the first and second recording magnetic heads are connected in series to the rotary transformer at said first channel, the second magnetic head elements in the first and second recording magnetic heads are connected in series to the rotary transformer at said second channel, the first magnetic head elements in the first and second reproducing magnetic heads are connected in parallel to said rotary transformer at said third channel, the second magnetic head elements in the first and second reproducing magnetic heads are connected in parallel to said rotary transformer at said fourth channel, each of the first and second recording signals is recordable on a magnetic tape when the magnetic tape slidingly contacts the corresponding magnetic head element in either of the first and second recording magnetic heads, said first and second recording signals supplied from the rotary transformer are recorded by said first recording magnetic head which are then reproduced 90° out of phase with the first recording magnetic head by said first reproducing magnetic head as the first and second reproduced signals, respectively, when the first reproducing magnetic head slidingly contacts the magnetic tape and said first and second recording signals are also recorded by the second recording magnetic head which are then reproduced 90° out of phase with the second recording magnetic head by said second reproducing magnetic head, as the first and second reproduced signals, respectively, when the second reproducing magnetic head slidingly contacts the magnetic tape.

2. A rotary head apparatus comprising:

a rotary drum having a first recording magnetic head that includes a first pair of magnetic head elements, a second recording magnetic head that includes a second pair of magnetic head elements, a first reproducing magnetic head that includes a third pair of magnetic head elements, and a second reproducing magnetic head that includes a fourth pair of magnetic head elements, wherein the magnetic head elements of each pair of magnetic heads are arranged adjacent to each other, the first recording magnetic head, the first reproducing magnetic head, the second recording magnetic head, and the second reproducing magnetic head are arranged in this order and are equally spaced by 90° in a circumferential direction at a circumferential surface of the rotary drum, the first and second recording magnetic heads are oppositely mounted at symmetrical positions with a rotating shaft of the rotary drum held therebetween, and the first and second reproducing magnetic heads are oppositely disposed at symmetrical positions with the rotating shaft being held therebetween, a rotary transformer containing a rotary side transformer is disposed on a side of the rotary drum and a fixed side transformer is disposed at a predetermined fixed position, the rotary transformer is configured to supply a signal to each of the first and second magnetic heads and includes a first channel that supplies a first recording signal to a first magnetic head element in each of the first and second recording magnetic heads, a second channel that supplies a second recording signal to a second magnetic head element in each of the first and second recording magnetic heads, a third channel to which a first reproduced signal is supplied from a first magnetic head element in each of the first and second reproducing magnetic heads and a fourth channel to which a second reproduced signal is supplied from a second magnetic head element in each of the first and second reproducing magnetic heads, the first magnetic head elements in the first and second recording magnetic heads are connected in series to the rotary transformer at the first channel and the second magnetic head elements in the first and second recording magnetic heads are connected in series to the rotary transformer at the second channel, the first magnetic head elements in the first and second reproducing magnetic heads are connected in parallel to the rotary transformer at the third channel through a first preamplifier circuit that amplifies the first reproduced signal of the first magnetic head element of the first reproducing magnetic head and through a second preamplifier circuit that amplifies the first reproduced signai of the first magnetic head element of the second reproducing magnetic head the second magnetic head elements in the first and second reproducing magnetic heads are connected in parallel to the rotary transformer at the fourth channel through a third preamplifier circuit that amplifies the second reproduced signal of the second magnetic head element of the first reproducing magnetic head and through the fourth preamplifier circuit that amplifies the second reproduced signal of the second magnetic head element of the second reproducing magnetic head, each of the first and second recording signals is recordable on a magnetic tape when the magnetic tape slidingly contacts the corresponding magnetic head element in either of the first and second recording magnetic heads, the first and second recording signals supplied from the rotary transformer are recorded by the first recording magnetic head which are then reproduced 90° out of phase with the first recording magnetic head by the first reproducing magnetic head as the first and second reproduced signals, respectively, when the first reproducing magnetic head slidingly contacts the magnetic tape, the first and second recording signals are also recorded by the second recording magnetic head which are then reproduced 90° out of phase with the second recording magnetic head by the second reproducing magnetic head, as the first and second reproduced signals, respectively, when the second reproducing magnetic head slidingly contacts the magnetic tape, and the rotary transformer is provided with a fifth channel that supplies power as well as an overlapping changing-over pulse signal to each of the first, second, third and fourth preamplifier circuits, the changing-over pulse signal operative to select one of the first and second preamplifier circuits as well as one of the third and fourth preamplifier circuits.

* * * * *

UNITED STATES PATENT AND TRADEMARK OFFICE
CERTIFICATE OF CORRECTION

PATENT NO. : 6,542,322 B2
DATED : April 1, 2003
INVENTOR(S) : Kenji Maemine

It is certified that error appears in the above-identified patent and that said Letters Patent is hereby corrected as shown below:

Column 11,
Line 54, delete "signai" and substitute -- signal -- in its place.
Line 55, immediately after "head" insert -- , -- (comma).

Signed and Sealed this

Eighth Day of July, 2003

JAMES E. ROGAN
*Director of the United States Patent and Trademark Office*